(12) United States Patent
Dinan et al.

(10) Patent No.: US 11,157,336 B2
(45) Date of Patent: Oct. 26, 2021

(54) TECHNOLOGIES FOR EXTENDING TRIGGERED OPERATIONS

(71) Applicant: Intel Corporation, Santa Clara, CA (US)

(72) Inventors: James Dinan, Hudson, MA (US);
Mario Flajslik, Hopkinton, MA (US);
Timo Schneider, Hudson, MA (US);
Keith D. Underwood, Powell, TX (US)

(73) Assignee: Intel Corporation, Santa Clara, CA (US)

( * ) Notice: Subject to any disclaimer, the term of this patent is extended or adjusted under 35 U.S.C. 154(b) by 717 days.

(21) Appl. No.: 15/859,389

(22) Filed: Dec. 30, 2017

(65) Prior Publication Data
US 2019/0042337 A1 Feb. 7, 2019

(51) Int. Cl.
*G06F 9/54* (2006.01)
*G06F 9/30* (2018.01)

(52) U.S. Cl.
CPC .......... *G06F 9/546* (2013.01); *G06F 9/30087* (2013.01); *G06F 9/542* (2013.01)

(58) Field of Classification Search
None
See application file for complete search history.

(56) References Cited

U.S. PATENT DOCUMENTS

2016/0149819 A1\* 5/2016 Hussain
2016/0381120 A1\* 12/2016 Flajslik
2018/0287954 A1\* 10/2018 Dinan

OTHER PUBLICATIONS

"Fabric Collective Accelerator (FCA)" Mellanox Technologies, www.mellanox.com, 2014, 2 pages.
"Bull eXascale Interconnect for HPC Systems", Oct. 2017, downloaded from https://atos.net/wp-content/uploads/2017/10/W-BXI-en1-web-1.pdf on Mar. 4, 2021, 12 pages.
"Libfabric OpenFabrics", downloaded from http://web.archive.org/web/20170313110849/https:/ofiwg.github.io/libfabric/ on Mar. 9, 2021.

(Continued)

*Primary Examiner* — Syed A Roni
(74) *Attorney, Agent, or Firm* — Compass IP Law, PC

(57) ABSTRACT

Technologies for extending triggered operations include a host fabric interface (HFI) of a compute device configured to detect a triggering event associated with a counter, increment the counter, and determine whether a value of the counter matches a trigger threshold of a triggered operation in a triggered operation queue associated with the counter. The HFI is further configured to execute, one or more commands associated with the triggered operation upon determining that the value of the counter matches the trigger threshold, and determine, subsequent to the execution of the one or more commands, whether the triggered operation corresponds to a recurring triggered operation. The HFI is additionally configured to increment, in response to a determination that the triggered operation corresponds to a recurring triggered operation, the value of the trigger threshold by a threshold increment and re-insert the triggered operation into the triggered operation queue. Other embodiments are described herein.

25 Claims, 5 Drawing Sheets

(56) References Cited

OTHER PUBLICATIONS

Barrett et al, "The Portals 4.0 Network Programming Interface," Sandia Report, SAND2012-10087, Unlimited Release, Printed Nov. 2012, 150 pages.
Barrett et al, "Using Triggered Operations to Offload Rendezvous Messages," Sandia National Laboratories, Sep. 2011, 8 pages.
Barrett et al, "The Portals 4.1 Network Programming Interface," Sandia National Laboratories Report, No. SAND2017-3825. Apr. 2017.
Di Girolamo et al, "Exploiting Offload Enabled Network Interfaces", IEEE Micro, vol. 36, Issue: 4, Jul.-Aug. 2016, 7 pages.
Flajslik et al, "On the Fence: An Offload Approach to Ordering One-Sided Communication," 2015 9th International Conference on Partitioned Global Address Space Programming Models, 2015, 12 pages.
Larkins et al, "Extending a Message Passing Runtime to Support Partitioned, Global Logical Address Spaces," COMHPC'16, IEEE, Nov. 2016, 7 pages.
Schneider et al, "Fast Networks and Slow Memories: A Mechanism for Mitigating Bandwidth Mismatches," 2017 IEEE 25th Annual Symposium on High-Performance Interconnects (HOTI), Aug. 28-30, 2017, 8 pages.
First Office Action for U.S. Appl. No. 15/941,509, dated May 6, 2021, 9 pages.

\* cited by examiner

TECHNOLOGIES FOR EXTENDING TRIGGERED OPERATIONS

STATEMENT REGARDING FEDERALLY SPONSORED RESEARCH

This invention was made with Government support under contract number H98230A-13-D-0124 awarded by the Department of Defense. The Government has certain rights in this invention.

BACKGROUND

Many high-performance computing (HPC) and datacenter applications are network latency sensitive with respect to the overall performance of the respective applications being executed thereon. One significant latency factor is the amount of time it takes to receive a response after posting a request. Oftentimes, the processing required to service the request is minimal. For example, simply receiving the request in some collective communication patterns (e.g., tree-based barrier) could be sufficient to trigger a response. Accordingly, to enable applications to perform application-level offloading of communication patterns, host fabric interfaces (HFIs) typically rely on triggered operations, which are supported by various networking application programming interfaces (APIs), such as Portals 4, OpenFabrics Interfaces (OFI) libfabric, etc. Triggered operations are communication operations that are issued by the application and will be performed when a future communication event occurs. For example, a broadcast operation may be offloaded by issuing triggered operations which can be fired upon a future communication event having been detected, at which time data can be forwarded to the intended recipient.

However, various limitations exist in present implementations. For example, the parameters (e.g., buffer, message size, matching information, destination, etc.) of such triggered operations are typically fixed at the time of issue by software and, as such, the parameters cannot be changed prior to the associated operations being fired. While this limitation exists to enable the triggered operation management to be implemented separately from the command and message processing, communication patterns in which a sender and receiver do not both have complete prior knowledge of data transfer parameters generally cannot be supported using present approaches to triggered operations. Additionally, triggered operations are typically set up by a processor and trigger at most once, after which time they are removed from an applicable offload accelerator. However, since many HPC applications carry out the same communication patterns more than once, this can lead to increased processor overhead.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
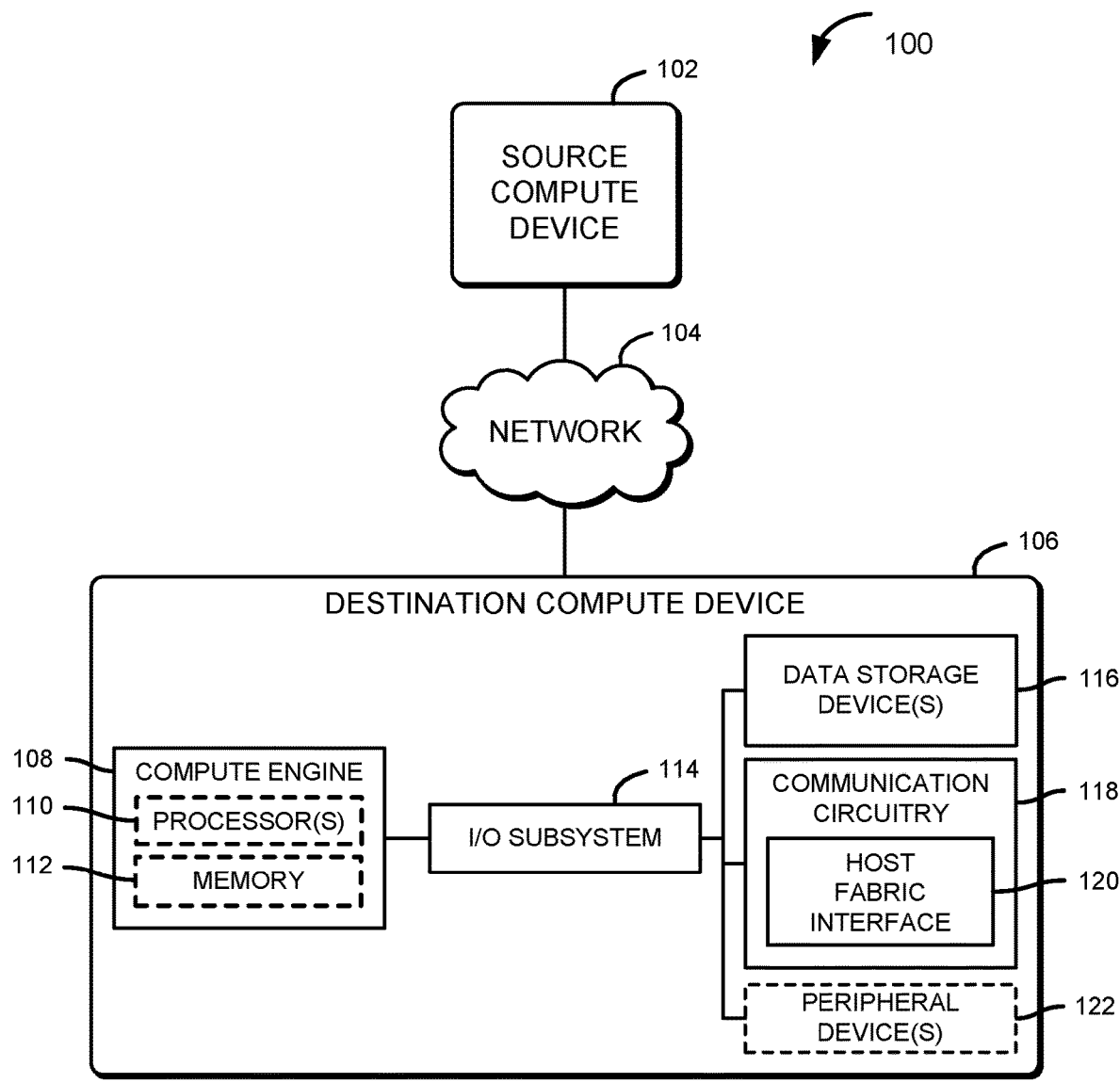
FIG. 1 is a simplified block diagram of at least one embodiment of a system for extending triggered operations that includes a source compute device and a destination compute device communicatively coupled via a network.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for extending triggered operations includes a source compute device 102 communicatively coupled to a destination compute device 106 via a network 104. While illustratively shown as having a single source compute device 102 and a single destination compute device 106, the system 100 may include multiple source compute devices 102 and multiple destination compute devices 106. It should be appreciated that the source compute device 102 and destination compute device 106 have been illustratively designated herein as being one of a "source" and a "destination" for the purposes of providing clarity to the description and that the source compute device 102 and/or the destination compute device 106 may be capable of performing the functions described herein. It should be further appreciated that the source compute device 102 and the destination compute device 106 may reside in the same data center or high-performance computing (HPC) environment. In other words, the source compute device 102 and destination compute device 106 may reside in the same network 104 connected via one or more wired interconnects.

In use, the source compute device 102 and the destination compute device 106 transmit and receive network traffic (e.g., network packets, frames, etc.) to/from each other. Oftentimes, such communications are latency sensitive such that the overall performance of the application in such environments depends on the amount of time it takes to receive a response to a transmitted network packet. For example, the destination compute device 106 may receive a network packet from the source compute device 102. Upon receipt of a network packet, the destination compute device 106 identifies how to process the network packet. To do so, the destination compute device 106 relies on one or more instructions previously received from an application that is to process the network packet in order to receive data associated with the network packet (e.g., the payload of the network packet, an indication of receipt of the network packet, etc.). Such processing of the network packet can include application-level offloading of communication patterns associated with the network packet to the network interface of the destination compute device 106. The offloading of such communication patterns (i.e., onto the network interface) can reduce many of the latencies which are inherent in network communications and, consequently, reduce the amount of time taken to perform the offloaded operations.

To manage the timing of the offload operations, the application may rely on one or more hardware-supported triggered operations which are associated with a triggering event (e.g., a network communication related event, a network packet processing event, etc.). Triggered operations include operations which are issued by the application and will be performed when a future event or series of events occur. For example, a triggered operation may be a communication operation issued by the application that will be performed upon the occurrence of a future communication event or series of communication events. In an illustrative example, a broadcast operation can be offloaded by issuing triggered operations which will be fired and forward data after the message has been received (e.g., from a parent node in a broadcast tree). Oftentimes, the amount of processing required to service a particular request is minimal. For example, the processing required to service the request may be prompted by having received the network packet, as in some collective communication patterns (e.g., tree-based communication patterns), or a processing condition/action associated therewith.

Under certain conditions, the triggered operation may be repeated, or may benefit from being dynamically updated at runtime. Accordingly, unlike existing technologies, the destination compute device 106, or more particularly the host fabric interface (HFI) of the destination compute device 106, is configured to identify a recurring triggered operation such that the triggered operation can be reused (i.e., not canceled upon completion and recreated thereafter). Additionally, the HFI is configured to store parameters of the triggered operation to local memory (i.e., memory local to the HFI), such that the parameters can be copied out of the local memory to a buffer in host memory, updated as a function of the event which triggered the triggered operation, and returned to the local memory from the buffer in host memory. Accordingly, unlike existing technologies which rely on a static set of parameters, the HFI can support triggered operations which require changing the parameters.

The destination compute device 106 may be embodied as any type of computation or computer device capable of performing the functions described herein, including, without limitation, a computer, a server (e.g., stand-alone, rack-mounted, blade, etc.), a sled (e.g., a compute sled, an accelerator sled, a storage sled, a memory sled, etc.), an enhanced network interface controller (NIC) (e.g., a host fabric interface (HFI)), a network appliance (e.g., physical or virtual), a router, switch (e.g., a disaggregated switch, a rack-mounted switch, a standalone switch, a fully managed switch, a partially managed switch, a full-duplex switch, and/or a half-duplex communication mode enabled switch), a web appliance, a distributed computing system, a processor-based system, and/or a multiprocessor system.

As shown in FIG. 1, the illustrative destination compute device 106 includes a compute engine 108, an I/O subsystem 114, one or more data storage devices 116, communication circuitry 118, and, in some embodiments, one or more peripheral devices 122. It should be appreciated that the destination compute device 106 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 108 may be embodied as any type of device or collection of devices capable of performing the various compute functions as described herein. In some embodiments, the compute engine 108 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 108 may include, or may be embodied as, one or more processors 110 (i.e., one or more central processing units (CPUs)) and memory 112.

The processor(s) 110 may be embodied as any type of processor capable of performing the functions described herein. For example, the processor(s) 110 may be embodied as a single-core processor, a multi-core processor, a digital signal processor, a microcontroller, or other processor or processing/controlling circuit. In some embodiments, the processor (s) 110 may be embodied as, include, or otherwise be coupled to a field programmable gate array (FPGA), an application specific integrated circuit (ASIC), reconfigurable hardware or hardware circuitry, or other specialized hardware to facilitate performance of the functions described herein.

The memory 112 may be embodied as any type of volatile (e.g., dynamic random access memory (DRAM), etc.) or non-volatile memory or data storage capable of performing the functions described herein. It should be appreciated that the memory 112 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 108 is communicatively coupled to other components of the destination compute device 106 via the I/O subsystem 114, which may be embodied as circuitry and/or components to facilitate input/output operations with the processor 110, the memory 112, and other components of the destination compute device 106. For example, the I/O subsystem 114 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 114 may form a portion of a system-on-a-chip (SoC) and be incorporated, along with one or more of the processor 110, the memory 112, and other components of the destination compute device 106, on a single integrated circuit chip.

The one or more data storage devices 116 may be embodied as any type of storage device(s) configured for short-term or long-term storage of data, such as, for example, memory devices and circuits, memory cards, hard disk drives, solid-state drives, or other data storage devices. Each data storage device 116 may include a system partition that stores data and firmware code for the data storage device 116. Each data storage device 116 may also include an operating system partition that stores data files and executables for an operating system.

The communication circuitry 118 may be embodied as any communication circuit, device, or collection thereof, capable of enabling communications between the destination compute device 106 and other computing devices, such as the source compute device 102, as well as any network communication enabling devices, such as an access point, network switch/router, etc., to allow communication over the network 104. Accordingly, the communication circuitry 118 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

It should be appreciated that, in some embodiments, the communication circuitry 118 may include specialized circuitry, hardware, or combination thereof to perform pipeline logic (e.g., hardware algorithms) for performing the functions described herein, including applying the hash functions, processing network packets (e.g., parse received network packets, determine destination computing devices for each received network packets, forward the network packets to a particular buffer queue of a respective host buffer of the destination compute device 106, etc.), performing computational functions, etc.

In some embodiments, performance of one or more of the functions of communication circuitry 118 as described herein may be performed by specialized circuitry, hardware, or combination thereof of the communication circuitry 118, which may be embodied as a system-on-a-chip (SoC) or otherwise form a portion of a SoC of the destination compute device 106 (e.g., incorporated on a single integrated circuit chip along with a processor 110, the memory 112, and/or other components of the destination compute device 106). Alternatively, in some embodiments, the specialized circuitry, hardware, or combination thereof may be embodied as one or more discrete processing units of the destination compute device 106, each of which may be capable of performing one or more of the functions described herein.

The illustrative communication circuitry 118 includes an HFI 120, which may also be referred to as a network interface controller (NIC) in some embodiments. The HFI 120 may be embodied as one or more add-in-boards, daughtercards, network interface cards, controller chips, chipsets, or other devices that may be used by the destination compute device 106 to connect with another compute device (e.g., the source compute device 102). In some embodiments, the HFI 120 may be embodied as part of a system-on-a-chip (SoC) that includes one or more processors, or included on a multichip package that also contains one or more processors. In some embodiments, the HFI 120 may include a local processor (not shown) and/or a local memory (not shown) that are both local to the HFI 120. In such embodiments, the local processor of the HFI 120 may be capable of performing one or more of the functions of a processor 110 described herein. Additionally or alternatively, in such embodiments, the local memory of the HFI 120 may be integrated into one or more components of the destination compute device 106 at the board level, socket level, chip level, and/or other levels.

The one or more peripheral devices 122 may include any type of device that is usable to input information into the destination compute device 106 and/or receive information from the destination compute device 106. The peripheral devices 122 may be embodied as any auxiliary device usable to input information into the destination compute device 106, such as a keyboard, a mouse, a microphone, a barcode reader, an image scanner, etc., or output information from the destination compute device 106, such as a display, a speaker, graphics circuitry, a printer, a projector, etc. It should be appreciated that, in some embodiments, one or more of the peripheral devices 122 may function as both an input device and an output device (e.g., a touchscreen display, a digitizer on top of a display screen, etc.). It should be further appreciated that the types of peripheral devices 122 connected to the destination compute device 106 may depend on, for example, the type and/or intended use of the destination compute device 106. Additionally or alternatively, in some embodiments, the peripheral devices 122 may include one or more ports, such as a USB port, for example, for connecting external peripheral devices to the destination compute device 106.

The source compute device 102 may be embodied as any type of computation or computer device capable of performing the functions described herein, including, without limitation, a smartphone, a mobile computing device, a tablet computer, a laptop computer, a notebook computer, a computer, a server (e.g., stand-alone, rack-mounted, blade, etc.), a sled (e.g., a compute sled, an accelerator sled, a storage sled, a memory sled, etc.), a network appliance (e.g., physical or virtual), a web appliance, a distributed computing system, a processor-based system, and/or a multiprocessor system. While not illustratively shown, it should be appreciated that source compute device 102 includes similar and/or like components to those of the illustrative destination compute device 106. As such, figures and descriptions of the like components are not repeated herein for clarity of the description with the understanding that the description of the corresponding components provided above in regard to the destination compute device 106 applies equally to the corresponding components of the source compute device 102. Of course, it should be appreciated that the computing devices may include additional and/or alternative components, depending on the embodiment.

The network 104 may be embodied as any type of wired or wireless communication network, including but not limited to a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, etc.), as needed to facilitate communication between the destination compute device 106 and the source compute device 102, which are not shown to preserve clarity of the description.

Figure 2:
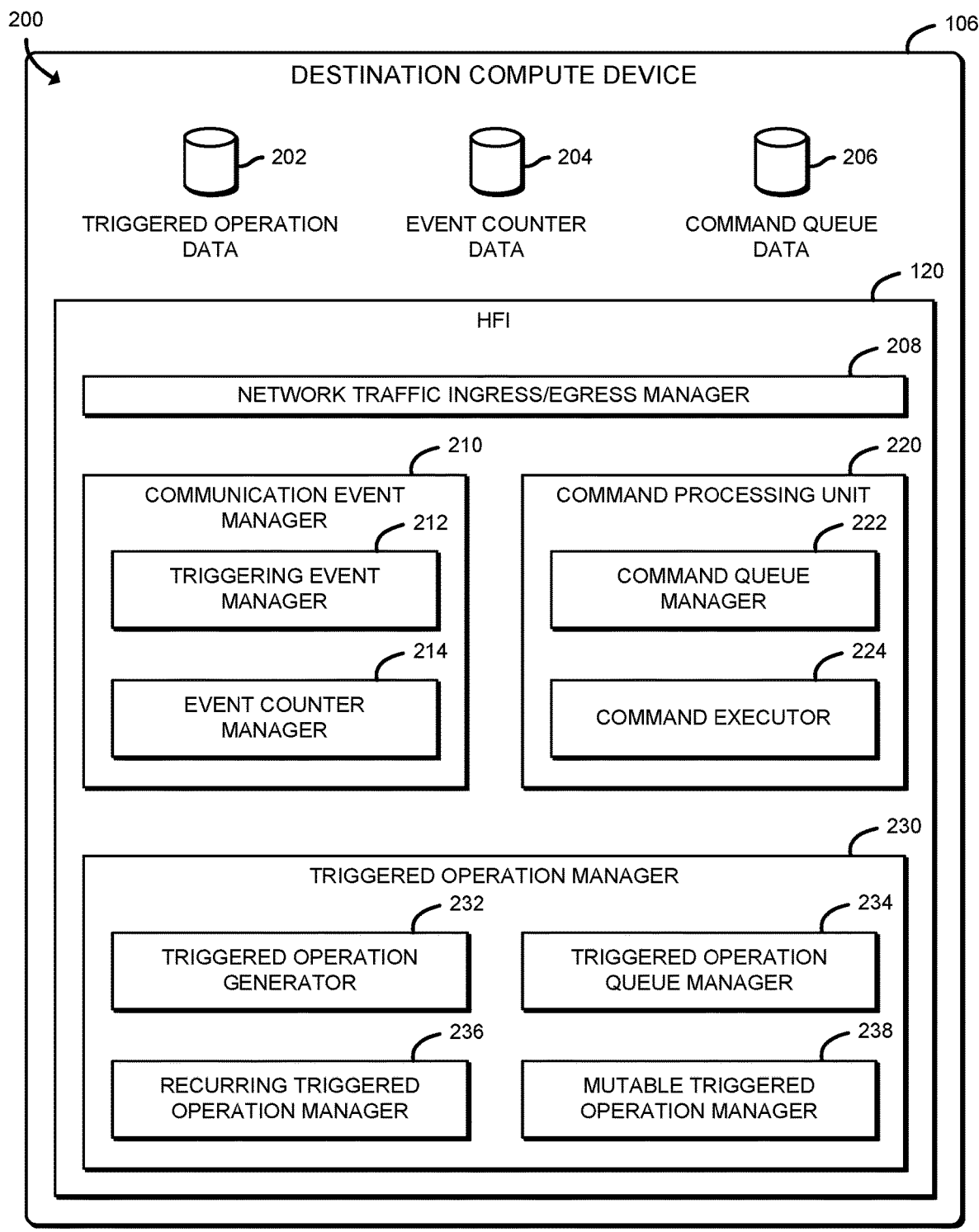
FIG. 2 is a simplified block diagram of at least one embodiment of an environment of the destination compute device of the system of FIG. 1.

Referring now to FIG. 2, in use, the destination compute device 106 establishes an environment 200 during operation. The illustrative environment 200 includes a network traffic ingress/egress manager 208, a communication event manager 210, a command processing unit 220, and a triggered operation manager 230. The various components of the environment 200 may be embodied as hardware, firmware, software, or a combination thereof. As such, in some embodiments, one or more of the components of the environment 200 may be embodied as circuitry or collection of electrical devices (e.g., network traffic ingress/egress management circuitry 208, communication event management circuitry 210, command processing circuitry 220, triggered operation management circuitry 230, etc.).

As illustratively shown, the network traffic ingress/egress management circuitry 208, the communication event management circuitry 210, the command processing circuitry 220, and the triggered operation management circuitry 230 form a portion of the HFI 120. However, it should be appreciated that, in other embodiments, one or more functions of the network traffic ingress/egress management circuitry 208, the communication event management circuitry 210, the command processing circuitry 220, and the triggered operation management circuitry 230 as described herein may form a portion of one or more of the compute engine 108, the I/O subsystem 114, the communication circuitry 118, and/or other components of the destination compute device 106.

Additionally, in some embodiments, one or more of the illustrative components may form a portion of another component and/or one or more of the illustrative components may be independent of one another. Further, in some embodiments, one or more of the components of the environment 200 may be embodied as virtualized hardware components or emulated architecture, which may be established and maintained by the HFI 120, the compute engine 108, or other components of the destination compute device 106. It should be appreciated that the destination compute device 106 may include other components, sub-components, modules, sub-modules, logic, sub-logic, and/or devices commonly found in a computing device, which are not illustrated in FIG. 2 for clarity of the description.

In the illustrative environment 200, the destination compute device 106 additionally includes triggered operation data 202, event counter data 204, and command queue data 206, each of which may be accessed by the various components and/or sub-components of the destination compute device 106. Further, each of the triggered operation data 202, the event counter data 204, and the command queue data 206 may be accessed by the various components of the destination compute device 106. Additionally, it should be appreciated that in some embodiments the data stored in, or otherwise represented by, each of the triggered operation data 202, the event counter data 204, and the command queue data 206 may not be mutually exclusive relative to each other. For example, in some implementations, data stored in the triggered operation data 202 may also be stored as a portion of one or more of the event counter data 204 and/or the command queue data 206, or vice versa. As such, although the various data utilized by the destination compute device 106 is described herein as particular discrete data, such data may be combined, aggregated, and/or otherwise form portions of a single or multiple data sets, including duplicative copies, in other embodiments.

The network traffic ingress/egress manager 208, which may be embodied as hardware, firmware, software, virtualized hardware, emulated architecture, and/or a combination thereof as discussed above, is configured to receive inbound and route/transmit outbound network traffic. To do so, the illustrative network traffic ingress/egress manager 208 is configured to facilitate inbound network communications (e.g., network traffic, network packets, network flows, etc.) to the destination compute device 106. Accordingly, the network traffic ingress/egress manager 208 is configured to manage (e.g., create, modify, delete, etc.) connections to physical and virtual network ports (i.e., virtual network interfaces) of the destination compute device 106 (e.g., via the communication circuitry 118), as well as the ingress buffers/queues associated therewith. Additionally, the network traffic ingress/egress manager 208 is configured to facilitate outbound network communications (e.g., network traffic, network packet streams, network flows, etc.) from the destination compute device 106. To do so, the network traffic ingress/egress manager 208 is configured to manage (e.g., create, modify, delete, etc.) connections to physical and virtual network ports/interfaces of the destination compute device 106 (e.g., via the communication circuitry 118), as well as the egress buffers/queues associated therewith.

The communication event manager 210, which may be embodied as hardware, firmware, software, virtualized hardware, emulated architecture, and/or a combination thereof as discussed above, is configured to manage the relationship between triggered operations and received communication events. To do so, the illustrative communication event manager 210 includes a triggering event manager 212 and an event counter manager 214. The triggering event manager 212 is configured to determine whether an event corresponds to, or is otherwise mapped to, a particular counter, and if so, notify the event counter manager 214. Accordingly, the event counter manager 214 is configured to manage the event counters (i.e., increment the counters). To do so, the event counter manager 214 is configured to allocate, initialize (e.g., to an initial value of zero), and update the event counters (e.g., by an increment of one or a predetermined threshold increment value greater than zero). In some embodiments, the event counter values and/or mapping information may be included in the event counter data.

It should be appreciated that each of the triggering event manager 212 and the event counter manager 214 of the illustrative communication event manager 210 may be separately embodied as hardware, firmware, software, virtualized hardware, emulated architecture, and/or a combination thereof. For example, the triggering event manager 212 may be embodied as a hardware component, while the event counter manager 214 may be embodied as a virtualized hardware component or as some other combination of hardware, firmware, software, virtualized hardware, emulated architecture, and/or a combination thereof.

The command processing unit 220, which may be embodied as hardware, firmware, software, virtualized hardware, emulated architecture, and/or a combination thereof as discussed above, is configured to process the commands, or instructions, associated with a triggered operation that has been fired (e.g., such as may be received from the triggered operation queue manager 234). To do so, the illustrative command processing unit 220 includes a command queue manager 222 and a command executor 224. The command queue manager 222 is configured to receive commands which indicate to the command processing unit 220 which processes are to be conducted on what data as a function of a triggered operation having been triggered. Upon receipt of each command, the command queue manager 222 is configured to queue the command into the applicable queue (e.g., relative to a priority of the command, a priority of the triggering event, the type of offload being performed as a function of the command, etc.). The command executor 224 is configured to either execute the commands (e.g., offloading command(s) to the appropriate accelerator, fetching/setting data, etc.). In some embodiments, the command queue and/or information related thereto may be stored in the command queue data 206.

It should be appreciated that each of the command queue manager 222 and the command executor 224 of the illustrative command processing unit 220 may be separately embodied as hardware, firmware, software, virtualized hardware, emulated architecture, and/or a combination thereof. For example, the command queue manager 222 may be embodied as a hardware component, while the command executor 224 may be embodied as a virtualized hardware component or as some other combination of hardware, firmware, software, virtualized hardware, emulated architecture, and/or a combination thereof.

The triggered operation manager 230, which may be embodied as hardware, firmware, software, virtualized hardware, emulated architecture, and/or a combination thereof as discussed above, is configured to manage the triggered operations. To do so, the illustrative triggered operation manager 230 includes a triggered operation generator 232, a triggered operation queue manager 234, a recurring triggered operation manager 236, and a mutable triggered operation manager 238. The triggered operation generator 232 is configured to create a triggered operation. To do so, the triggered operation generator 232 is configured to identify the triggering event to fire the triggered operation and identify one or more parameters (i.e., identifying parameters) of the triggered operation. The identifying parameters of the triggered operation may include any information usable to identify when the triggered operation is fired (e.g., a trigger threshold, a threshold increment, etc.) and/or what actions are to be undertaken when the triggered operation is fired (i.e., one or more commands to be performed upon execution of the triggered operation).

In some embodiments, the triggered operation generator 232 is additionally configured to store the identifying parameters in the triggered operation data 202. In some embodiments, the triggered operation generator 232 is configured to store the identifying parameters in a memory location local to the HFI. Accordingly, in such embodiments, at least a portion of the triggered operation data 202 may be stored local to the HFI 120. The triggered operation generator 232 is further configured to create the triggered operations, insert the created triggered operations into a triggered operation queue, and return a handle of the created triggered operation to an application that requested the triggered operation be generated.

The triggered operation queue manager 234, which may be embodied as hardware, firmware, software, virtualized hardware, emulated architecture, and/or a combination thereof as discussed above, is configured to manage the triggered operation queue. To do so, the triggered operation queue manager 234 is configured to receive and queue triggered operations (e.g., from the triggered operation generator 232). As will be described in further detail below, the triggered operations are queued as a function of their respective trigger thresholds. In other words, the triggered operations are sorted from lowest to highest trigger threshold. Accordingly, the triggered operation queue manager 234 is configured to insert the created triggered operations based on the trigger thresholds. It should be appreciated that more than one triggered operation may have the same trigger threshold. Accordingly, in such embodiments, the triggered operation queue manager 234 may be configured to insert the created triggered operations based on the trigger threshold and some other parameter, such as a priority level or time/order of creation, for example.

The triggered operation queue manager 234 is additionally configured to determine whether any counter values match a threshold value of a triggered operation in a corresponding triggered operation queue. To do so, the triggered operation queue manager 234 may be configured to receive an indication of an updated (e.g., incremented) counter value associated with a particular triggered operation queue and compare the threshold value of the first item in the queue (i.e., the triggered operation at the head of the queue) to determine whether that threshold value matches the updated counter value. If so, the triggered operation queue manager 234 may be configured to initiate processing of the one or more commands associated with the triggered operation (e.g., by copying the command(s) to an applicable command queue of the command processing unit 220 to execute the command(s)).

As described previously, more than one triggered operation in the triggered operation queue may have the same threshold value. Accordingly, the triggered operation queue manager 234 is configured to iterate through the triggered operation queue until all the matches have been determined. It should be appreciated that the triggered operation queue manager 234 may be configured to manage more than one triggered operation queue. For example, there may be a separate triggered operation queue for each event counter.

The recurring triggered operation manager 236, which may be embodied as hardware, firmware, software, virtualized hardware, emulated architecture, and/or a combination thereof as discussed above, is configured to manage recurring triggered operations. To do so, the recurring triggered operation manager 236 is configured to, upon execution of a recurring triggered operation (e.g., as may be identified by a threshold increment parameter of the triggered operation), increase the threshold value of the triggered operation by the threshold increment value associated with the recurring triggered operation. Additionally, the recurring triggered operation manager 236 is configured to re-insert the triggered operation back into the triggered operation queue (e.g., by notifying the triggered operation queue manager 234).

The mutable triggered operation manager 238, which may be embodied as hardware, firmware, software, virtualized hardware, emulated architecture, and/or a combination thereof as discussed above, is configured to manage the updating of triggered operation parameters between issuing and firing. To do so, the mutable triggered operation manager 238 is configured to, using a handle of the mutable triggered operation made available upon generation of the mutable triggered operation, generate a sequence of triggered operations which are usable to copy one or more parameters of the mutable triggered operation from memory local to the HFI into a user buffer in host memory (e.g., the memory 112, the data storage device(s) 116, etc.), where they can be updated, and retrieve the updated parameters back from the user buffer in host memory to the memory local to the HFI. In other words, the commands used to update the memory regions are provided as triggered operations. As such, unlike present techniques, parameter updates may be performed as part of a triggered sequence, thereby further enabled updates to be performed without loss of offload capability (i.e., more operations can be offloaded than present techniques allow).

It should be appreciated that each of the triggered operation generator 232, the triggered operation queue manager 234, the recurring triggered operation manager 236, and the mutable triggered operation manager 238 of the illustrative triggered operation manager 230 may be separately embodied as hardware, firmware, software, virtualized hardware, emulated architecture, and/or a combination thereof. For example, the triggered operation generator 232 may be embodied as a hardware component, while the triggered operation queue manager 234, the recurring triggered operation manager 236, and/or the mutable triggered operation manager 238 may be embodied as a virtualized hardware component or as some other combination of hardware, firmware, software, virtualized hardware, emulated architecture, and/or a combination thereof.

Figure 3:
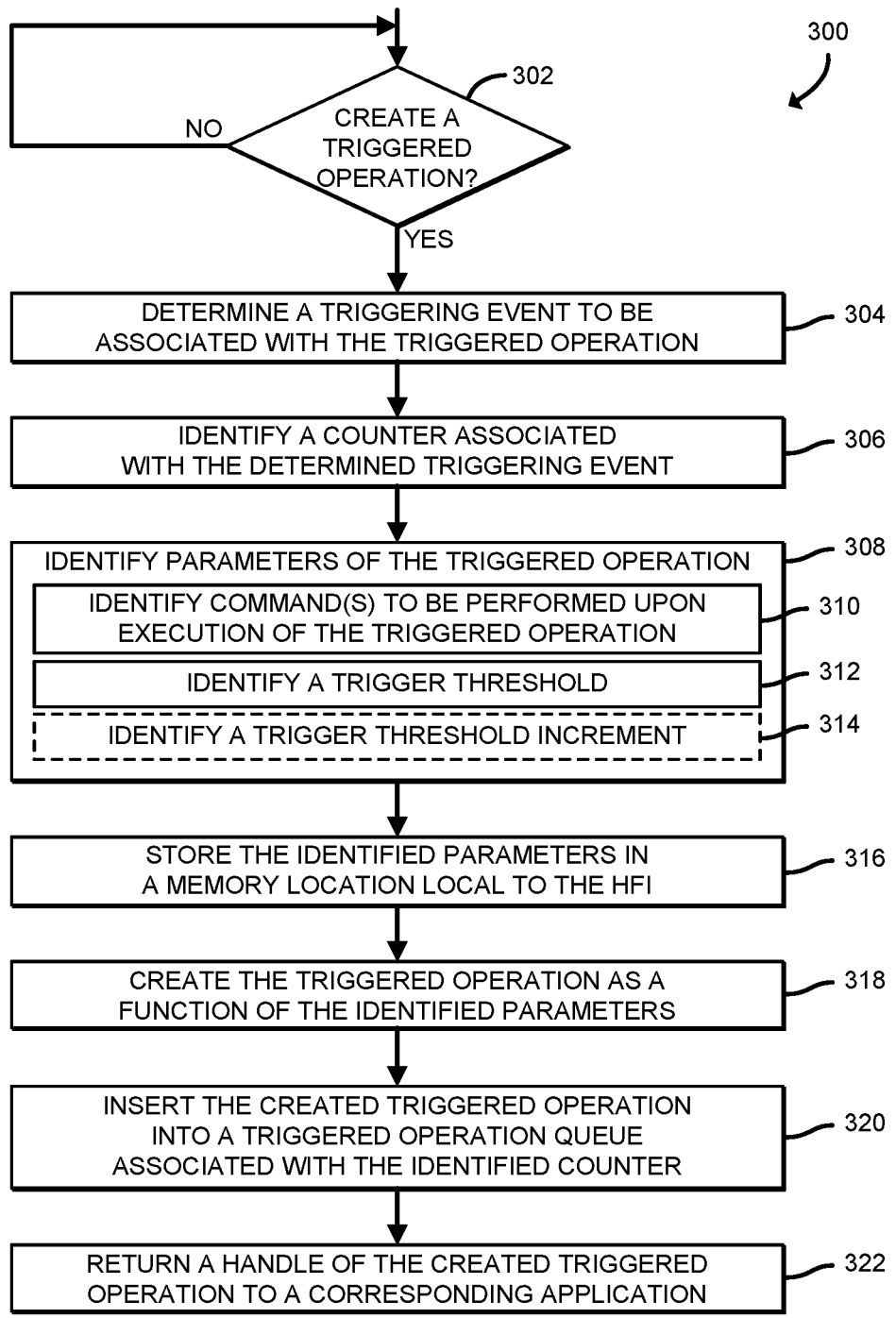
FIG. 3 is a simplified flow diagram of at least one embodiment of a method for creating a triggered operation that may be executed by the destination compute device of FIGS. 1 and 2.

Referring now to FIG. 3, a method 300 for creating a triggered operation is shown which may be executed by a compute device (e.g., the destination compute device 106 of FIGS. 1 and 2), or more particularly by an HFI of the compute device (e.g., the HFI 120 of FIG. 2). The method 300 begins with block 302, in which the HFI 120 determines whether to create a triggered operation, such as may be based on receiving a request (i.e., a creation request) from an application presently executing on the destination compute device 106. It should be appreciated that triggered operations may also be created in response to one or more instructions, or commands, associated with an already created triggered request (see, e.g., the method 500 of FIG. 5). If so, the method 300 advances to block 304, in which the HFI 120 determines a triggering event to be associated with the triggered operation (e.g., based on information received with the request from the application).

In block 306, the HFI 120 identifies a counter associated with the determined triggering event. As such, it should be appreciated that the counter has been previously supplied and initialized by the user when the triggered event was created. As described previously, the counter is typically associated with incoming messages (e.g. a memory region that is posted for remote access, a posted receive operation, etc.) and the user has to specify the association between the triggered events and counters. It should be appreciated that the counter is typically initialized by the user because there may be a race between initializing the counter and a message arriving/event being generated. In some embodiments, the counter may not be reset and is allowed to continue increasing (e.g. for the implementation of a triggered barrier) because the synchronization overhead of resetting the counter may be too great.

In block 308, the HFI 120 is configured to identify one or more parameters (i.e., identifying parameters) of the triggered operation. As described previously, the identifying parameters of the triggered operation may include any information usable to identify when the triggered operation is fired (e.g., a trigger threshold, a threshold increment, etc.) and/or what actions are to be undertaken when the triggered operation is fired (i.e., one or more commands to be performed upon execution of the triggered operation). Accordingly, in block 310, the HFI 120 identifies one or more commands to be performed upon execution of the triggered operation. Additionally, in block 312, the HFI identifies a trigger threshold. Further, in some embodiments (e.g., for recurring triggered operations), the HFI 120 identifies a trigger threshold increment in block 314.

In block 316, the HFI 120 stores the identified parameters in a memory location local to the HFI 120. In block 318, the HFI 120 creates the triggered operation as a function of the identified parameters. In block 320, the HFI 120 inserts the created triggered operation into a triggered operation queue associated with the identified counter. As described previously, the triggered operations are sorted in the queue from lowest to highest trigger threshold. Accordingly, the HFI will insert the created triggered operation based on the trigger threshold of the created triggered operation relative to the trigger thresholds of the triggered operations presently in the triggered operation queue. As also described previously, more than one triggered operation may have the same threshold value. Accordingly, in such embodiments, the HFI 120 may insert the created triggered operation into the triggered operation queue based on the trigger threshold and some other parameter, such as a priority level or time/order of creation associated with the created triggered operation (e.g., which may be determinable from the identifying parameters and/or an explicit priority value received from the requesting application). In block 322, the HFI 120 returns a handle of the created triggered operation to a corresponding application which initiated the method 300 (i.e., requested that the triggered operation be created).

Figure 4:
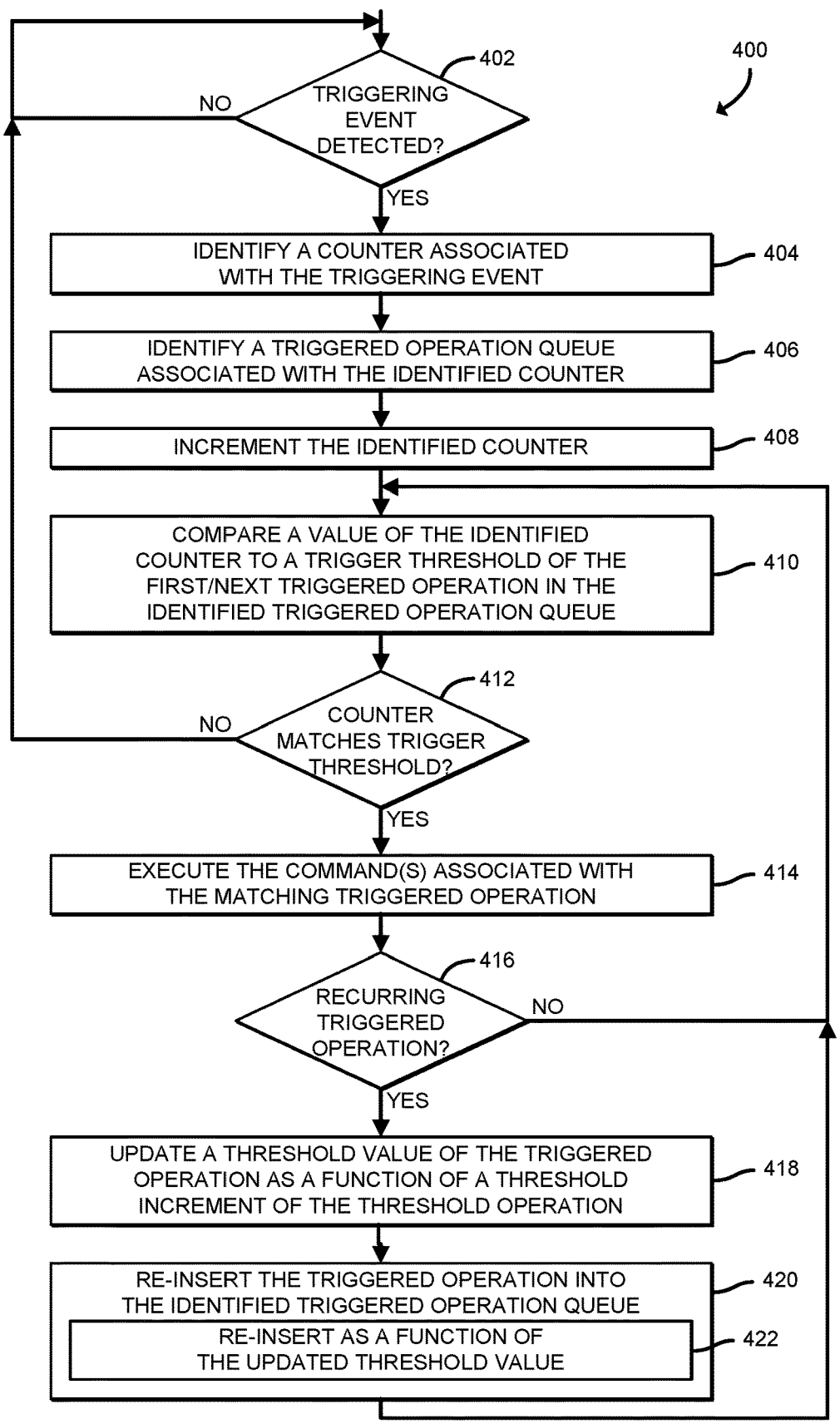
FIG. 4 is a simplified flow diagram of at least one embodiment of a method for managing a detected triggering event that may be executed by the destination compute device of FIGS. 1 and 2.

Referring now to FIG. 4, a method 400 for managing a detected triggering event is shown which may be executed by a compute device (e.g., the destination compute device 106 of FIGS. 1 and 2), or more particularly by an HFI of the compute device (e.g., the HFI 120 of FIG. 2). The method 400 begins with block 402, in which the HFI 120 determines whether a triggering event has been detected. If so, the method 400 advances to block 404, in which the HFI 120 identifies a counter associated with the triggering event. In block 406, the HFI 120 identifies a triggered operation queue associated with the identified counter. In block 408, the HFI 120 increments the identified counter.

In block 410, the HFI 120 compares a value of the identified counter to the first triggered operation in the identified triggered operation queue. In block 412, the HFI 120 determines whether the value of the identified counter matches the trigger threshold of the first triggered operation in the identified triggered operation queue. If not, the method 400 returns to block 402 to determine whether another triggering event has been detected; otherwise, the method 400 advances to block 414. In block 414, the HFI 120 executes the one or more commands associated with the matching triggered operation (see, e.g., the method 500 of FIG. 5). In block 416, the HFI 120 determines whether the triggered operation corresponds to a recurring triggered operation. To do so, the triggered operation may include a trigger threshold increment and or another indicator of the triggered operation being a recurring triggered operation.

If the HFI 120 determines the triggered operation does not correspond to a recurring triggered operation, the method 400 returns to block 410 to compares a value of the identified counter to the next triggered operation in the identified triggered operation queue. Otherwise, the method 400 advances to block 418, in which the HFI 120 updates the threshold value of the triggered operation by an amount equal to the threshold increment. In block 420, the HFI 120 re-inserts the triggered operation into the triggered operation queue. To do so, in block 422, the HFI 120 re-inserts the triggered operation into the triggered operation queue as a function of the updated threshold value before the method 400 returns to block 410 to again compare a value of the identified counter to the next triggered operation in the identified triggered operation queue.

Figure 5:
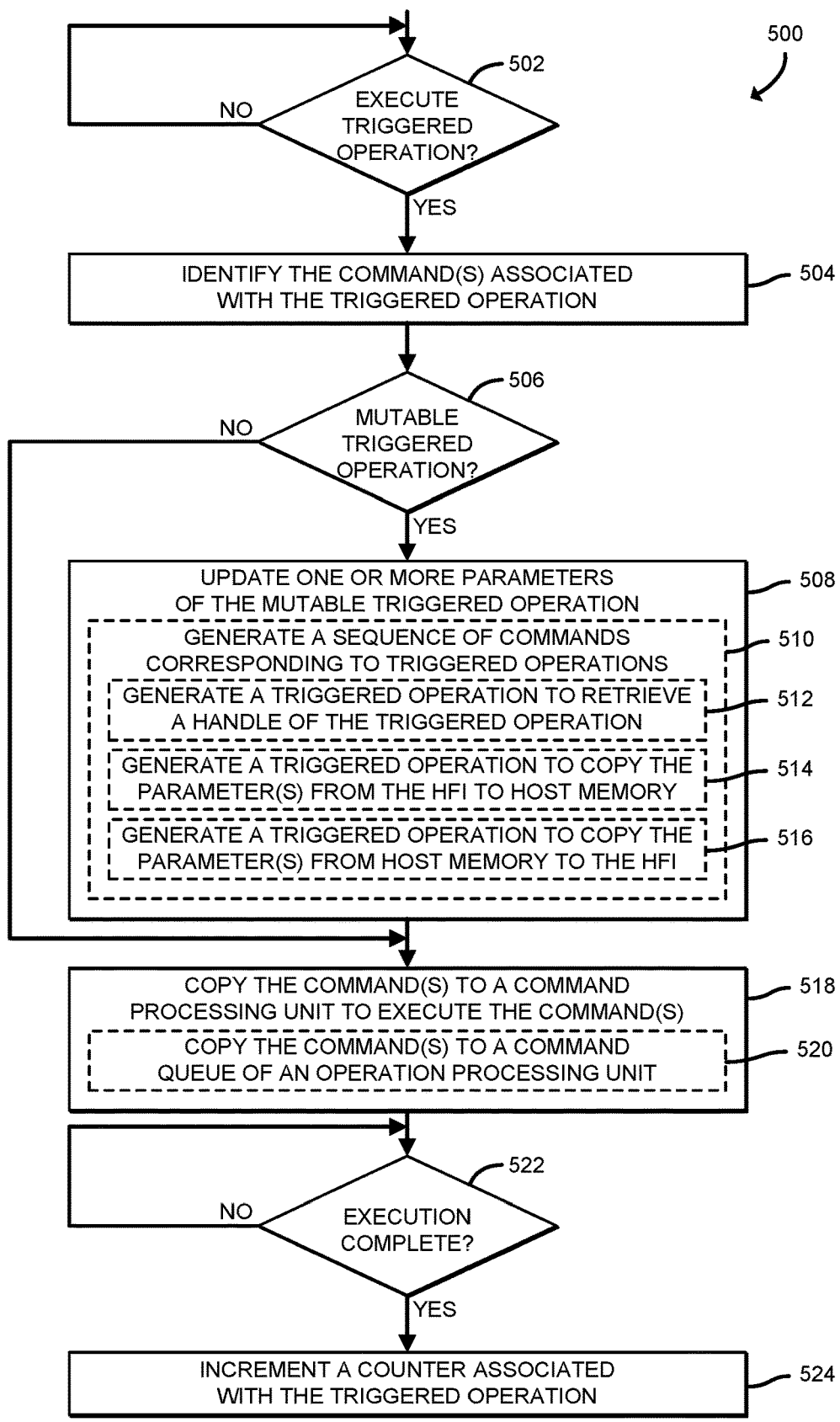
FIG. 5 is a simplified flow diagram of at least one embodiment of a method for executing a triggered operation that may be executed by the destination compute device of FIGS. 1 and 2.

Referring now to FIG. 5, a method 500 for executing a triggered operation is shown which may be executed by a compute device (e.g., the destination compute device 106 of FIGS. 1 and 2), or more particularly by an HFI of the compute device (e.g., the HFI 120 of FIG. 2). The method 500 begins with block 502, in which the HFI 120 determines whether to execute a triggered operation. If so, the method 500 advances to block 504, in which the HFI 120 identifies the one or more commands associated with the triggered operation. In block 506, the HFI 120 determines whether the triggered operation to be executed corresponds to a mutable triggered operation. In other words, the HFI 120 determines whether one or more of the parameter of the triggered operation can be updated. If the HFI 120 determines the triggered operation not a mutable triggered operation, the method 500 skips to block 518, which is described below; otherwise, the method 500 advances to block 508.

In block 508, the HFI 120 updates one or more parameters of the mutable triggered operation. To do so, in some embodiments, in block 510, the HFI 120 generates a sequence of commands corresponding to triggered operations to update the parameter(s) of the mutable triggered operation. For example, the HFI 120 may generate a triggered operation to retrieve a handle associated with the mutable triggered operation in block 512, generate another triggered operation to copy the parameter(s) from the HFI 120 to host memory in block 514, and generate still another triggered operation to copy the parameter(s) from the host memory to the HFI 120 (i.e., after the one or more parameters have been updated) in block 516.

In some embodiments, the series of triggered operations used to update the parameters of the mutable triggered operation may be generated ahead of time by the user. For example, in such embodiments, the user may be the only one who knows where the values needed to update parameters can be found. As such, the "mutation" is generally performed in host memory rather than doing it in memory local to the HFI 120. In an illustrative example, result(s) of one or more prior operations (e.g., a message size, a tag, a sender ID, etc.) may be desired to update a particular parameter or set of parameters. Accordingly, the HFI 120 is configured to transfer this state to the application rather than keeping the state in memory local to the HFI 120. In other words, the user may be responsible for gathering the necessary information (e.g. using triggered operations) and use such information to update the mutable parameters.

It should be appreciated that each generated triggered operation has a corresponding threshold value. As such, each of the corresponding threshold values should be set to the order in which the generated triggered operations are to be performed. It should be appreciated that, in some embodiments, more than one of the generated triggered operations may have the same threshold value and that the corresponding counter may be incremented upon completion of each generated triggered operation. Accordingly, the corresponding threshold values should be set to account for the number of generated triggered operations which are to be performed prior to each respective generated triggered operation. It should be further appreciated that, in some embodiments, additional and/or alternative triggered operations may be generated in block 510.

In block 518, the HFI 120 copies the command(s) to a command processing unit of the HFI 120 (e.g., the command processing unit 220 of FIG. 2) to execute the command(s). To do so, in block 520, the HFI 120 copies the command(s) to a command queue of the operation processing unit. In block 522, the HFI 120 determines whether the execution of the command has completed. If so, the method 500 advances to block 524, in which the HFI 120 increments a counter associated with the triggered operation.

EXAMPLES

Illustrative examples of the technologies disclosed herein are provided below. An embodiment of the technologies may include any one or more, and any combination of, the examples described below.

Example 1 includes a compute device for extending triggered operations, the compute device comprising a compute engine; and a host fabric interface (HFI) to detect a triggering event associated with a counter; increment, subsequent to having detected the triggering event, the counter; determine whether a value of the counter matches a trigger threshold of a triggered operation in a triggered operation queue associated with the counter; execute, in response to a determination that the value of the counter matches the trigger threshold, one or more commands associated with the triggered operation; determine, subsequent to the execution of the one or more commands, whether the triggered operation corresponds to a recurring triggered operation; increment, in response to a determination that the triggered operation corresponds to the recurring triggered operation, the value of the trigger threshold by a threshold increment; and re-insert the triggered operation into the triggered operation queue.

Example 2 includes the subject matter of Example 1, and wherein to determine whether the triggered operation corresponds to a recurring triggered operation comprises to determine whether the threshold increment is greater than zero.

Example 3 includes the subject matter of any of Examples 1 and 2, and wherein to execute the one or more commands associated with the triggered operation comprises to identify the one or more commands corresponding to the triggered operation; and copy the identified one or more commands to a command queue of an command processing unit of the HFI.

Example 4 includes the subject matter of any of Examples 1-3, and wherein the HFI is further to determine whether the triggered operation corresponds to a mutable triggered operation; and update, in response to a determination that the triggered operation corresponds to the mutable triggered operation and prior to having executed the one or more commands associated with the triggered operation, one or more parameters of the triggered operation.

Example 5 includes the subject matter of any of Examples 1-4, and wherein to update the one or more parameters of the triggered operation comprises to copy the one or more parameters from a storage location local to the HFI to a storage location in a host memory of the compute device; and copy, in response to having received an indication that the one or more parameters have been modified, the one or more parameters from the host memory of the compute device to the storage location local to the HFI.

Example 6 includes the subject matter of any of Examples 1-5, and wherein the HFI is further to determine, in response to having received a triggered operation creation request from an application presently executing on the compute device and prior to having detected the triggering event, the triggering event to be associated with the triggered operation; identify the counter associated with determined triggering event; identify one or more parameters of the triggered operation; store the identified one or more parameters to a storage location local to the HFI; create the triggered operation as a function of the one or more parameters; insert the created triggered operation into the triggered operation queue; and return a handle of the created triggered operation to the application.

Example 7 includes the subject matter of any of Examples 1-6, and wherein the one or more parameters of the triggered operation include information usable to identify the triggering event.

Example 8 includes the subject matter of any of Examples 1-7, and wherein the one or more parameters of the triggered operation include information usable to identify the one or more commands associated with the triggered operation.

Example 9 includes the subject matter of any of Examples 1-8, and wherein to insert the created triggered operation into the triggered operation queue comprises to insert the created triggered operation into the triggered operation queue as a function of the trigger threshold.

Example 10 includes the subject matter of any of Examples 1-9, and wherein to re-insert the triggered operation into the triggered operation queue comprises to re-insert the triggered operation into the triggered operation queue as a function of the incremented trigger threshold.

Example 11 includes the subject matter of any of Examples 1-10, and wherein to detect the triggering event comprises to detect that a value of the counter is equal to the trigger threshold.

Example 12 includes the subject matter of any of Examples 1-11, and wherein to detect the triggering event comprises to detect a communication event in response to having received a network packet at the HFI.

Example 13 includes a method for extending triggered operations, the method comprising detecting, by a host fabric interface (HFI) of a compute device, a triggering event associated with a counter; incrementing, by the HFI and subsequent to having detected the triggering event, the counter; determining, by the HFI, whether a value of the counter matches a trigger threshold of a triggered operation in a triggered operation queue associated with the counter; executing, by the HFI and in response to a determination that the value of the counter matches the trigger threshold, one or more commands associated with the triggered operation; determining, by the HFI and subsequent to the execution of the one or more commands, whether the triggered operation corresponds to a recurring triggered operation; incrementing, by the HFI and in response to a determination that the triggered operation corresponds to the recurring triggered operation, the value of the trigger threshold by a threshold increment; and re-inserting, by the HFI, the triggered operation into the triggered operation queue.

Example 14 includes the subject matter of Example 13, and wherein determining whether the triggered operation corresponds to a recurring triggered operation comprises determining whether the threshold increment is greater than zero.

Example 15 includes the subject matter of any of Examples 13 and 14, and wherein executing the one or more commands associated with the triggered operation comprises identifying the one or more commands corresponding to the triggered operation; and copying the identified one or more commands to a command queue of an command processing unit of the HFI.

Example 16 includes the subject matter of any of Examples 13-15, and further including determining, by the HFI, whether the triggered operation corresponds to a mutable triggered operation; and updating, by the HFI and in response to a determination that the triggered operation corresponds to the mutable triggered operation and prior to having executed the one or more commands associated with the triggered operation, one or more parameters of the triggered operation.

Example 17 includes the subject matter of any of Examples 13-16, and wherein updating the one or more parameters of the triggered operation comprises copying the one or more parameters from a storage location local to the HFI to a storage location in a host memory of the compute device; and copying, in response to having received an indication that the one or more parameters have been modified, the one or more parameters from the host memory of the compute device to the storage location local to the HFI.

Example 18 includes the subject matter of any of Examples 13-17, and further including determining, by the HFI and in response to having received a triggered operation creation request from an application presently executing on the compute device and prior to having detected the triggering event, the triggering event to be associated with the triggered operation; identifying, by the HFI, the counter associated with determined triggering event; identifying, by the HFI, one or more parameters of the triggered operation; storing, by the HFI, the identified one or more parameters to a storage location local to the HFI; creating, by the HFI, the triggered operation as a function of the one or more parameters; inserting, by the HFI, the created triggered operation into the triggered operation queue; and returning, by the HFI, a handle of the created triggered operation to the application.

Example 19 includes the subject matter of any of Examples 13-18, and wherein the one or more parameters of the triggered operation include information usable to identify the triggering event.

Example 20 includes the subject matter of any of Examples 13-19, and wherein the one or more parameters of the triggered operation include information usable to identify the one or more commands associated with the triggered operation.

Example 21 includes the subject matter of any of Examples 13-20, and wherein inserting the created triggered operation into the triggered operation queue comprises inserting the created triggered operation into the triggered operation queue as a function of the trigger threshold.

Example 22 includes the subject matter of any of Examples 13-21, and wherein re-inserting the triggered operation into the triggered operation queue comprises re-inserting the triggered operation into the triggered operation queue as a function of the incremented trigger threshold.

Example 23 includes the subject matter of any of Examples 13-22, and wherein detecting the triggering event comprises detecting that a value of the counter is equal to the trigger threshold.

Example 24 includes the subject matter of any of Examples 13-23, and wherein detecting the triggering event comprises detecting a communication event in response to having received a network packet at the HFI.

Example 25 includes one or more machine-readable storage media comprising a plurality of instructions stored thereon that, in response to being executed, cause a compute device to perform the method of any of Examples 13-24.

Example 26 includes a compute device comprising one or more processors; one or more memory devices having stored therein a plurality of instructions that, when executed by the one or more processors, cause the compute device to perform the method of any of Examples 13-24.

Example 27 includes a compute device for extending triggered operations, the compute device comprising communication event management circuitry to detect a triggering event associated with a counter, and increment, subsequent to having detected the triggering event, the counter; triggered operation management circuitry to determine whether a value of the counter matches a trigger threshold of a triggered operation in a triggered operation queue associated with the counter; and command processing unit circuitry to execute, in response to a determination that the value of the counter matches the trigger threshold, one or more commands associated with the triggered operation, and wherein the triggered operation management circuitry is further to determine, subsequent to the execution of the one or more commands, whether the triggered operation corresponds to a recurring triggered operation; increment, in response to a determination that the triggered operation corresponds to the recurring triggered operation, the value of the trigger threshold by a threshold increment; and re-insert the triggered operation into the triggered operation queue.

Example 28 includes the subject matter of Example 27, and wherein to determine whether the triggered operation corresponds to a recurring triggered operation comprises to determine whether the threshold increment is greater than zero.

Example 29 includes the subject matter of any of Examples 27 and 28, and wherein to execute the one or more commands associated with the triggered operation comprises to identify the one or more commands corresponding to the triggered operation; and copy the identified one or more commands to a command queue of the command processing unit circuitry.

Example 30 includes the subject matter of any of Examples 27-29, and wherein the triggered operation management circuitry is further to determine whether the triggered operation corresponds to a mutable triggered operation; and update, in response to a determination that the triggered operation corresponds to the mutable triggered operation and prior to having executed the one or more commands associated with the triggered operation, one or more parameters of the triggered operation.

Example 31 includes the subject matter of any of Examples 27-30, and wherein to update the one or more parameters of the triggered operation comprises to copy the one or more parameters from a storage location local to a host fabric interface (HFI) of the compute device to a storage location in a host memory of the compute device; and copy, in response to having received an indication that the one or more parameters have been modified, the one or more parameters from the host memory of the compute device to the storage location local to the HFI.

Example 32 includes the subject matter of any of Examples 27-31, and wherein the triggered operation management circuitry is further to determine, in response to having received a triggered operation creation request from an application presently executing on the compute device and prior to having detected the triggering event, the triggering event to be associated with the triggered operation; identify the counter associated with determined triggering event; identify one or more parameters of the triggered operation; store the identified one or more parameters to a storage location local to a host fabric interface (HFI) of the compute device; create the triggered operation as a function of the one or more parameters; insert the created triggered operation into the triggered operation queue; and return a handle of the created triggered operation to the application.

Example 33 includes the subject matter of any of Examples 27-32, and wherein the one or more parameters of the triggered operation include information usable to identify the triggering event.

Example 34 includes the subject matter of any of Examples 27-33, and wherein the one or more parameters of the triggered operation include information usable to identify the one or more commands associated with the triggered operation.

Example 35 includes the subject matter of any of Examples 27-34, and wherein to insert the created triggered operation into the triggered operation queue comprises to insert the created triggered operation into the triggered operation queue as a function of the trigger threshold.

Example 36 includes the subject matter of any of Examples 27-35, and wherein to re-insert the triggered operation into the triggered operation queue comprises to re-insert the triggered operation into the triggered operation queue as a function of the incremented trigger threshold.

Example 37 includes the subject matter of any of Examples 27-36, and wherein to detect the triggering event comprises to detect that a value of the counter is equal to the trigger threshold.

Example 38 includes the subject matter of any of Examples 27-37, and wherein to detect the triggering event comprises to detect a communication event in response to having received a network packet at a host fabric interface (HFI) of the compute device.

Example 39 includes a compute device for extending triggered operations, the compute device comprising circuitry for detecting, by a host fabric interface (HFI) of a compute device, a triggering event associated with a counter; circuitry for incrementing, by the HFI and subsequent to having detected the triggering event, the counter; circuitry for determining, by the HFI, whether a value of the counter matches a trigger threshold of a triggered operation in a triggered operation queue associated with the counter; circuitry for executing, by the HFI and in response to a determination that the value of the counter matches the trigger threshold, one or more commands associated with the triggered operation; means for determining, by the HFI and subsequent to the execution of the one or more commands, whether the triggered operation corresponds to a recurring triggered operation; means for incrementing, by the HFI and in response to a determination that the triggered operation corresponds to the recurring triggered operation, the value of the trigger threshold by a threshold increment; and means for re-inserting, by the HFI, the triggered operation into the triggered operation queue.

Example 40 includes the subject matter of Example 39, and wherein the means for determining whether the triggered operation corresponds to a recurring triggered operation comprises means for determining whether the threshold increment is greater than zero.

Example 41 includes the subject matter of any of Examples 39 and 40, and wherein the executing the one or more commands associated with the triggered operation comprises identifying the one or more commands corresponding to the triggered operation; and copying the identified one or more commands to a command queue of an command processing unit of the HFI.

Example 42 includes the subject matter of any of Examples 39-41, and further including means for determining, by the HFI, whether the triggered operation corresponds to a mutable triggered operation; and means for updating, by the HFI and in response to a determination that the triggered operation corresponds to the mutable triggered operation and prior to having executed the one or more commands associated with the triggered operation, one or more parameters of the triggered operation.

Example 43 includes the subject matter of any of Examples 39-42, and wherein the means for updating the one or more parameters of the triggered operation comprises means for copying the one or more parameters from a storage location local to the HFI to a storage location in a host memory of the compute device; and means for copying, in response to having received an indication that the one or more parameters have been modified, the one or more parameters from the host memory of the compute device to the storage location local to the HFI.

Example 44 includes the subject matter of any of Examples 39-43, and further including circuitry for determining, by the HFI and in response to having received a triggered operation creation request from an application presently executing on the compute device and prior to having detected the triggering event, the triggering event to be associated with the triggered operation; circuitry for identifying, by the HFI, the counter associated with determined triggering event; means for identifying, by the HFI, one or more parameters of the triggered operation; means for storing, by the HFI, the identified one or more parameters to a storage location local to the HFI; means for creating, by the HFI, the triggered operation as a function of the one or more parameters; means for inserting, by the HFI, the created triggered operation into the triggered operation queue; and circuitry for returning, by the HFI, a handle of the created triggered operation to the application.

Example 45 includes the subject matter of any of Examples 39-44, and wherein the one or more parameters of the triggered operation include information usable to identify the triggering event.

Example 46 includes the subject matter of any of Examples 39-45, and wherein the one or more parameters of the triggered operation include information usable to identify the one or more commands associated with the triggered operation.

Example 47 includes the subject matter of any of Examples 39-46, and wherein the means for inserting the created triggered operation into the triggered operation queue comprises means for inserting the created triggered operation into the triggered operation queue as a function of the trigger threshold.

Example 48 includes the subject matter of any of Examples 39-47, and wherein the means for re-inserting the triggered operation into the triggered operation queue comprises means for re-inserting the triggered operation into the triggered operation queue as a function of the incremented trigger threshold.

Example 49 includes the subject matter of any of Examples 39-48, and wherein detecting the triggering event comprises detecting that a value of the counter is equal to the trigger threshold.

Example 50 includes the subject matter of any of Examples 39-49, and wherein detecting the triggering event comprises detecting a communication event in response to having received a network packet at the HFI.

The invention claimed is:

1. A compute device for extending triggered operations, the compute device comprising:
   a compute engine; and
   a host fabric interface (HFI) to:
      detect a triggering event associated with a counter;
      increment, subsequent to having detected the triggering event, the counter;
      determine whether a value of the counter matches a trigger threshold of a triggered operation in a triggered operation queue associated with the counter;
      execute, in response to a determination that the value of the counter matches the trigger threshold, one or more commands associated with the triggered operation;
      determine, subsequent to the execution of the one or more commands, whether the triggered operation corresponds to a recurring triggered operation;
      increment, in response to a determination that the triggered operation corresponds to the recurring triggered operation, the value of the trigger threshold by a threshold increment; and
      re-insert the triggered operation into the triggered operation queue.

2. The compute device of claim 1, wherein to determine whether the triggered operation corresponds to a recurring triggered operation comprises to determine whether the threshold increment is greater than zero.

3. The compute device of claim 1, wherein to execute the one or more commands associated with the triggered operation comprises to:
   identify the one or more commands corresponding to the triggered operation; and
   copy the identified one or more commands to a command queue of an command processing unit of the HFI.

4. The compute device of claim 1, wherein the HFI is further to:
   determine whether the triggered operation corresponds to a mutable triggered operation; and
   update, in response to a determination that the triggered operation corresponds to the mutable triggered operation and prior to having executed the one or more commands associated with the triggered operation, one or more parameters of the triggered operation.

5. The compute device of claim 4, wherein to update the one or more parameters of the triggered operation comprises to:
copy the one or more parameters from a storage location local to the HFI to a storage location in a host memory of the compute device; and
copy, in response to having received an indication that the one or more parameters have been modified, the one or more parameters from the host memory of the compute device to the storage location local to the HFI.

6. The compute device of claim 1, wherein the HFI is further to:
determine, in response to having received a triggered operation creation request from an application presently executing on the compute device and prior to having detected the triggering event, the triggering event to be associated with the triggered operation;
identify the counter associated with determined triggering event;
identify one or more parameters of the triggered operation;
store the identified one or more parameters to a storage location local to the HFI;
create the triggered operation as a function of the one or more parameters;
insert the created triggered operation into the triggered operation queue; and
return a handle of the created triggered operation to the application.

7. The compute device of claim 6, wherein the one or more parameters of the triggered operation include information usable to identify the triggering event and the one or more commands associated with the triggered operation.

8. The compute device of claim 6, wherein to insert the created triggered operation into the triggered operation queue comprises to insert the created triggered operation into the triggered operation queue as a function of the trigger threshold.

9. The compute device of claim 1, wherein to re-insert the triggered operation into the triggered operation queue comprises to re-insert the triggered operation into the triggered operation queue as a function of the incremented trigger threshold.

10. The compute device of claim 1, wherein to detect the triggering event comprises to detect that a value of the counter is equal to the trigger threshold.

11. The compute device of claim 1, wherein to detect the triggering event comprises to detect a communication event in response to having received a network packet at the HFI.

12. One or more non-transitory machine-readable storage media comprising a plurality of instructions stored thereon that, in response to being executed, cause a compute device to:
detect, by a host fabric interface (HFI) of the compute device, a triggering event associated with a counter;
increment, by the HFI and subsequent to having detected the triggering event, the counter;
determine, by the HFI, whether a value of the counter matches a trigger threshold of a triggered operation in a triggered operation queue associated with the counter;
execute, by the HFI and in response to a determination that the value of the counter matches the trigger threshold, one or more commands associated with the triggered operation;
determine, by the HFI and subsequent to the execution of the one or more commands, whether the triggered operation corresponds to a recurring triggered operation;
increment, by the HFI and in response to a determination that the triggered operation corresponds to the recurring triggered operation, the value of the trigger threshold by a threshold increment; and
re-insert, by the HFI, the triggered operation into the triggered operation queue.

13. The one or more non-transitory machine-readable storage media of claim 12, wherein to determine whether the triggered operation corresponds to a recurring triggered operation comprises to determine whether the threshold increment is greater than zero.

14. The one or more non-transitory machine-readable storage media of claim 12, wherein to execute the one or more commands associated with the triggered operation comprises to:
identify the one or more commands corresponding to the triggered operation; and
copy the identified one or more commands to a command queue of an command processing unit of the HFI.

15. The one or more non-transitory machine-readable storage media of claim 12, wherein the plurality of instructions further cause the compute device to:
determine, by the HFI, whether the triggered operation corresponds to a mutable triggered operation; and
update, by the HFI and in response to a determination that the triggered operation corresponds to the mutable triggered operation and prior to having executed the one or more commands associated with the triggered operation, one or more parameters of the triggered operation.

16. The one or more non-transitory machine-readable storage media of claim 15, wherein to update the one or more parameters of the triggered operation comprises to:
copy the one or more parameters from a storage location local to the HFI to a storage location in a host memory of the compute device; and
copy, in response to having received an indication that the one or more parameters have been modified, the one or more parameters from the host memory of the compute device to the storage location local to the HFI.

17. The one or more non-transitory machine-readable storage media of claim 12, wherein the plurality of instructions further cause the compute device to:
determine, by the HFI and in response to having received a triggered operation creation request from an application presently executing on the compute device and prior to having detected the triggering event, the triggering event to be associated with the triggered operation;
identify, by the HFI, the counter associated with determined triggering event;
identify, by the HFI, one or more parameters of the triggered operation;
store, by the HFI, the identified one or more parameters to a storage location local to the HFI;
create, by the HFI, the triggered operation as a function of the one or more parameters;
insert, by the HFI, the created triggered operation into the triggered operation queue; and
return, by the HFI, a handle of the created triggered operation to the application.

18. The one or more non-transitory machine-readable storage media of claim 17, wherein the one or more parameters of the triggered operation include information usable to identify the triggering event and the one or more commands associated with the triggered operation.

19. The one or more non-transitory machine-readable storage media of claim 17, wherein to insert the created triggered operation into the triggered operation queue comprises to insert the created triggered operation into the triggered operation queue as a function of the trigger threshold.

20. The one or more non-transitory machine-readable storage media of claim 12, wherein to re-insert the triggered operation into the triggered operation queue comprises to re-insert the triggered operation into the triggered operation queue as a function of the incremented trigger threshold.

21. The one or more non-transitory machine-readable storage media of claim 12, wherein to detect the triggering event comprises to detect that a value of the counter is equal to the trigger threshold.

22. The one or more non-transitory machine-readable storage media of claim 12, wherein to detect the triggering event comprises to detect a communication event in response to having received a network packet at the HFI.

23. A compute device for extending triggered operations, the compute device comprising:
circuitry for detecting, by a host fabric interface (HFI) of a compute device, a triggering event associated with a counter;
circuitry for incrementing, by the HFI and subsequent to having detected the triggering event, the counter;
circuitry for determining, by the HFI, whether a value of the counter matches a trigger threshold of a triggered operation in a triggered operation queue associated with the counter;
circuitry for executing, by the HFI and in response to a determination that the value of the counter matches the trigger threshold, one or more commands associated with the triggered operation;
means for determining, by the HFI and subsequent to the execution of the one or more commands, whether the triggered operation corresponds to a recurring triggered operation;
means for incrementing, by the HFI and in response to a determination that the triggered operation corresponds to the recurring triggered operation, the value of the trigger threshold by a threshold increment; and
means for re-inserting, by the HFI, the triggered operation into the triggered operation queue.

24. The compute device of claim 23, further comprising:
means for determining, by the HFI, whether the triggered operation corresponds to a mutable triggered operation; and
means for updating, by the HFI and in response to a determination that the triggered operation corresponds to the mutable triggered operation and prior to having executed the one or more commands associated with the triggered operation, one or more parameters of the triggered operation.

25. The compute device of claim 24, wherein the means for updating the one or more parameters of the triggered operation comprises:
means for copying the one or more parameters from a storage location local to the HFI to a storage location in a host memory of the compute device; and
means for copying, in response to having received an indication that the one or more parameters have been modified, the one or more parameters from the host memory of the compute device to the storage location local to the HFI.

* * * * *